United States Patent [19]
Kajino et al.

[11] Patent Number: 5,886,779
[45] Date of Patent: Mar. 23, 1999

[54] LENS METER

[75] Inventors: Tadashi Kajino, Okazaki; Osamu Mita, Gamagori, both of Japan

[73] Assignee: Nidek Company,Ltd., Japan

[21] Appl. No.: 107,555

[22] Filed: Jun. 29, 1998

Related U.S. Application Data

[63] Continuation of Ser. No. 732,531, Oct. 15, 1996, abandoned, which is a continuation of Ser. No. 403,286, Mar. 13, 1995, abandoned.

[30]     Foreign Application Priority Data

Apr. 28, 1994  [JP]  Japan .................................. 6-114441

[51] Int. Cl.$^6$ ...................................................... G01B 9/00
[52] U.S. Cl. .......................................... 356/124; 356/127
[58] Field of Search ..................... 356/124, 125, 356/126, 127

[56]          References Cited

U.S. PATENT DOCUMENTS 4,033,696  7/1977  Nohda ...................... 356/127
5,173,739  12/1992  Kurachi et al. .................. 356/127

Primary Examiner—Hoa Q. Pham
Attorney, Agent, or Firm—Rossi & Associates

[57]          ABSTRACT

A lens meter comprising light sources for project luminous flux for measurement to a lens to be examined and a light receiving element for detecting the measuring luminous flux passed through the lens to be examined, wherein refractive characteristics of the lens is detected on the basis of the examined data by the light receiving element, the lens meter comprises a measurement target having predetermined patterns, device for moving the target to one of a plurality of arrangement positions on the optical path of the measuring luminous flux, device for selecting one position to which the measurement target is to be moved among a plurality of arrangement positions on the optical path on the basis of the examined data by the light receiving element, device for controlling the target moving device in accordance with the selection by the selecting device.

13 Claims, 4 Drawing Sheets

X: OPTIC AXIS OF MEASUREMENT LIGHT

X: OPTIC AXIS OF MEASUREMENT LIGHT

LENS METER

This is a continuation of application Ser. No. 08/732,532, filed Oct. 15, 1996 abandoned which is a continuation of application Ser. No. 08/403,286 filed Mar. 13, 1995 abandoned.

BACKGROUND OF THE INVENTION

1. Field of the Invention

The present invention relates to a lens meter, and more particularly to the lens meter capable of measuring optical characteristics of lenses to be examined, for instance spectacle lenses, contact lenses and the like.

2. Description of Related Art

Known is a measurement principle of lens meters such that a target provided with a predetermined pattern is disposed in front or behind of a lens to be examined and a light receiving element detects the optical image of the target deflected by passing through the lens to be examined, so that optical characteristics of the lens are obtained based on the detected results of the light receiving element.

When the position of the target is fixed in such a kind of lens meter, the optical image of the target formed on the light receiving element becomes a blurred image by the refractive power of the lens to be examined, the blur degree of the image becoming larger in proportional as the refractive power of the lens increases.

For preventing measuring errors from occurring due to blur of the image, there is also a lens meter in which the target is moved along an optic axis of measuring light according to the refractive power of the lens to be examined so that blur degree of the image formed on the light receiving element may be reduced.

However, the above mentioned lens meter in which the target is moved along the optic axis, the position of the optical image of the target being moved along with movement of the target, needs to detect an accurate position to which the target for carrying out high precise measurement. In the conventional lens meters having a system for moving a target along an optic axis of measuring light, it is difficult to detect always an accurate stop position of the target in reason of secular change and others. Accordingly, such a conventional apparatus is required providing with a detecting system for detecting the stop position of the target separately from the system for controlling movement of the target. This causes problems of complication in construction of the apparatus and the increased cost.

SUMMARY OF THE INVENTION

The present invention has been made in view of the above circumstances and has an object to overcome the above problems and to provide a lens meter with sufficient precision for practical use and a simplified construction.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a lens meter of this invention comprising light sources for project luminous flux for measurement to a lens to be examined and a light receiving element for detecting the measuring luminous flux passed through the lens to be examined, wherein refractive characteristics of the lens is detected on the basis of the examined data by the light receiving element, the lens meter comprises a measurement target having predetermined patterns, means for moving the target to one of a plurality of arrangement positions on the optical path of the measuring luminous flux, means for selecting one position to which the measurement target is to be moved among a plurality of arrangement positions on the optical path on the basis of the examined data by the light receiving element, and means for controlling the target moving means in accordance with the selection by the selecting means.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

Figure 1:
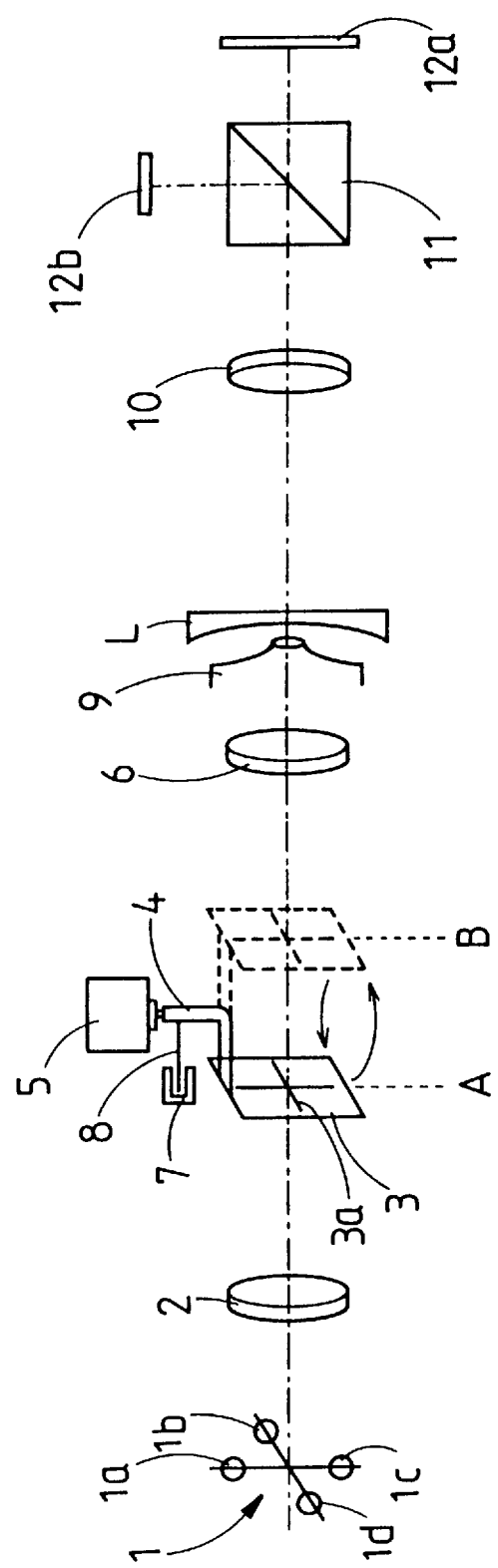
FIG. 1 is a diagram showing an optical arrangement of a lens meter of the first embodiment according to the present invention.

A detailed description of preferred embodiments of a lens meter embodying the present invention will now be given referring to the accompanying drawings. FIG. 1 shows an arrangement of the optical system in the apparatus of the first embodiment.

In the optical system, four light sources 1 (1a–1d) for measurement light, for instance, LEDs and the like are disposed closely to the focus point of an objective lens 2 and on a plate intersecting an optic axis of measuring light. These light sources 1a–1d are controlled so as to turn on one by one at predetermined intervals.

Numeral 3 is a target plate for measurement having crossing slits and installed on the rotating shaft 5a (shown in FIG. 3) of a pulse motor 5 through a holder 4. Accordingly, the target plate 3 is movable to two positions on the optical path by rotation of the pulse; one being indicated by A and another indicated by B in FIG. 1.

In the present embodiment, the center of the rotating shaft 5a of the pulse motor 5 is arranged closely to a focal point of the objective lens 2 and the collimating lens 6, and both positions A and B are predetermined so that the optical image of the slit of the target plate 3 disposed at the point A comes to formed on a detecting element when a lens of −5 diopter (called D hereinafter) is put on a nose piece mentioned later and the same of the target plate 3 disposed at the point B comes to form on a detecting element when a lens of +5 D is put on the nose piece. These positions A and B in which the target plate 3 is to be arranged are herein determined so as to enable accurately measuring lenses of diopter of high frequency in use. The position of the target plate should suitably be determined according to conditions, for instance, a kind of lens to be examined, the number of positions to which the target plate can be moved, etc.

Numeral 7 is a position sensor of shading type. Numeral 8 is a shade plate which is fixedly connected to the holder 4, so that the initial position of the target plate 3 is detected based on the shading position of the shade plate 8.

The optical system is further provided with a nose piece 9 on which the lens (L) to be examined is put, an image forming lens 10, a half prism 11 and a pair of one-dimensional position detectors 12 (12a, 12b), which are disposed on each plane crossing to the optic axis of the measuring light at right angles, another of which is disposed so that its detecting direction intersects at right angles with the same of the former. The nose piece 9 is disposed closely to the focal point of the collimating lens 6 and the image forming lens 10.

Diopter of the lens L to be examined is determined based on the position of the target plate 3 and the position on the one-dimensional position detector 12 of the optical image of the target.

Figure 2:
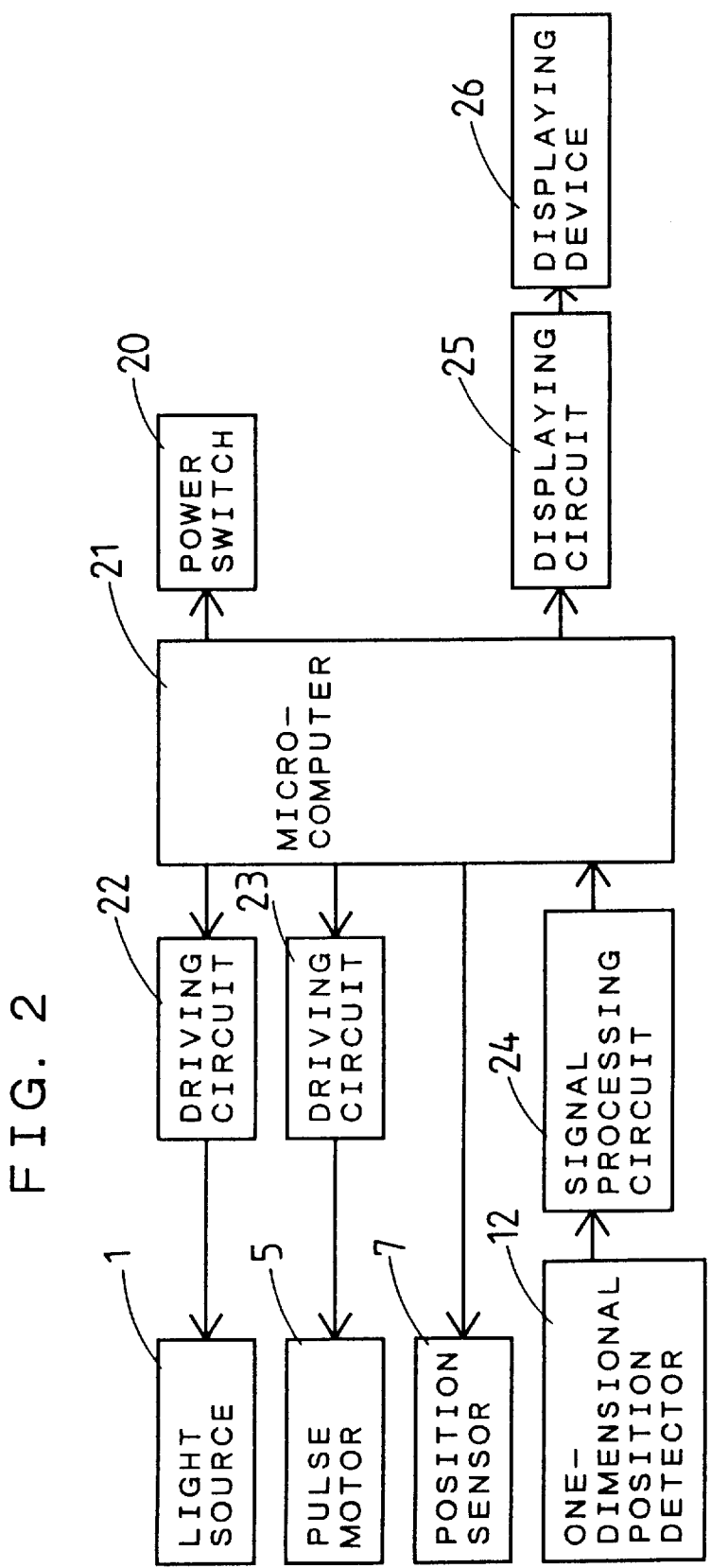
FIG. 2 is a block diagram of main electric systems of the lens meter of the first embodiment.

Operation of the lens meter having the optical system described above will be explained hereinafter with reference to FIG. 2 that is a block diagram of main electric systems.

When power source is charged through a power switch 20 provided in the lense meter body, microcomputer 21 drives a driving circuit 22 to turn on four light sources 1a–1d one by one, at the same time drives to a driving circuit 23 to rotate the pulse motor 5. By rotation of the pulse motor 5, the shade plate 8 fixed to the holder 4 is rotated, as well as the target plate 3. When the position sensor 7 detects the position of the shade plate 8, the microcomputer 21 stops rotation of the pulse motor 5, so that the target plate 3 is located at the position A which is the initial position of the target plate 3.

By then putting a lens L to be examined, which has any refractive power, on the nose piece 9, an optical image of the slit 3a formed through the lens on the one-dimensional position detector 12 (12a, 12b) is deflected through the lens. Signals detected at the one-dimensional position detector 12 are processed in a signal processing circuit 24 with a predetermined process, and is input to the microcomputer 21. Based on signals transmitted from the one-dimensional position detectors 12a and 12b, signals which correspond to each image formed by four light sources 1a–1d that are turned on one by one, the microcomputer 21 carries out a predetermined processes to thereby calculate the preliminary optical characteristics of the lens L. Such a calculating method of the optical characteristics of the lens to be examined has been proposed in U.S. Pat. No. 5,247,341 which was filed by the same applicant as the present invention, the details thereof are accordingly omitted herein.

Preliminary measurement generally means measurement prior to regular measurement. The present embodiment uses, for data of preliminary measurement, the refractive power of when the lens L is put on the optical axis of measuring light and the image of the target formed on the one-dimensional position detector 12 comes to deflect through the lens accordingly, but it is not necessary to limit to such data.

When judges that the equivalent spherical value of the lens to be examined is a minus value, the microcomputer 21 proceeds to measurement without moving the target plate 3. Then, the microcomputer 21 carries out alignment of the lens L by a conventional alignment mechanism along the optic axis of measurement light and displays the value detected at that aligned position.

When judges, alternatively, that the value is a plus value, the microcomputer 21 drives the driving circuit 23 to rotate the pulse motor 5 by an angle of 180°, i.e., by a half turn, and thereby moves the target plate 3 to the position B that corresponds to +5 D. After that, the microcomputer 21 calculates signals transmitted from the one-dimensional detectors 12a and 12b to determine optical characteristics of the lens L being put on the nose piece 9 again.

After the measurement with the target plate 3 located at the position B, when trying to successively measure another lens to be examined having a minus equivalent spherical value, the target plate 3 is shifted to the position A. This reason is that, if a lens to be examined has a minus equivalent spherical value, an optical image of the target formed on the one-dimensional position detector 12 can comes to be more approximately in focus when the target plate 3 is located at the position A than at the position B, the microcomputer 21 accordingly moves the target plate 3 at the position A to measure such a lens.

If the target plate 3 is located at the position A and the equivalent spherical value of the lens to be examined is judged to be plus, the microcomputer 21 moves the target plate 3 to the position B and then carries out the measurement of the lens. When judges that the positional code of the target plate 3 and the code of the lens to be examined are appropriate to each other, the microcomputer 21 does not move the target plate. It is possible to control the target plate 3 not to shift if no influence is exerted on examined data because the value D of the lens to be examined is small such as 1D, even if the positional code of the target plate 3 is different from one suitable for the code of the lens to be examined.

The examined data that are processed out by the microcomputer 21 are displayed on a displaying device 26 via a displaying circuit 25.

The above first embodiment using one target plate, so moving positions of the target plate on the optic axis are limited to two positions. If there is the necessity to improve measurement precision, it is possible to increase the number of moving position of the target plate by using a plurality of target plates.

Figure 3:
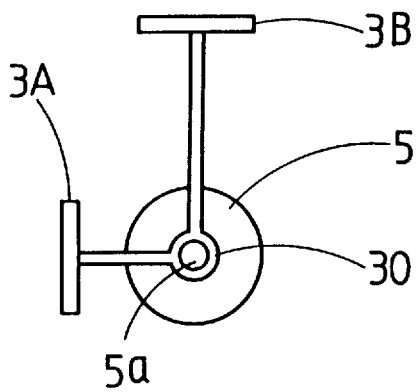
FIG. 3 is a schematic diagram showing two target plates arranged in the lens meter of the second embodiment.

FIG. 3 shows the second embodiment using two target plates. Two target plates 3A and 3B are connected to the rotating axis 5a of the pulse motor 5 through a holder 30, two target plates being arranged at right angles and at different distances from the center of the rotating shaft 5a.

These target plates are constructed so that, when a target plate is located at a predetermined position on the optical path, another target plate may not obstruct measuring luminous flux to pass along the optical path.

Figure 4:
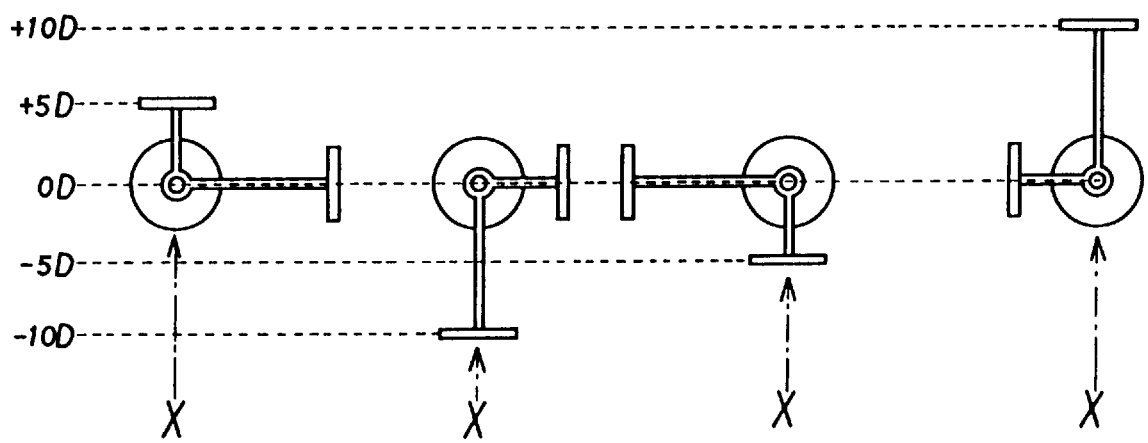
FIG. 4 is a diagram showing various moving positions of two target plates on an optical axis.

For instance, each distance of two target plates from the center of the rotating axis 5a is designed so that, when the center of the rotating axis of the pulse motor 5 is located at a position for 0D, the target plate 3A is movable to positions for +5D and −5D, the target plate 3B is movable to positions +10D and −10D respectively. The microcomputer 21 controls the pulse motor 5 to rotate every 90 angles, as shown in FIG. 4, the target plate can be moved to four different arrangement positions.

Figure 5:
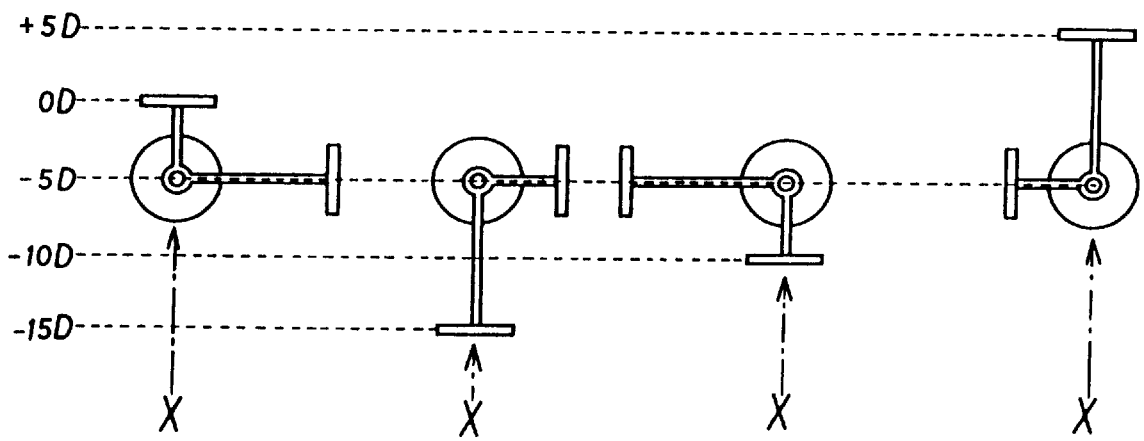
FIG. 5 is a diagram showing an example where stop positions of the target plates are optionally determined.

It is not necessary to always locate the rotating center of the target plates, that is, the center of the rotating axis of the pulse motor 5 at a position indicated by 0D, such positions to which the target plates are moved may optionally be set according to conditions of respective lenses to be examined, as shown in FIG. 5. In FIG. 5, codes of arrangement positions of the target plates 3A and 3B are not symmetrical, but it is effective if desiring that the target plate is moved to a position more apart in a direction of minus values or to a position for 0D.

As mentioned above, arrangement of target plates are designed that measuring luminous flux passing through the target plate disposed on the optical path may not be obstructed by the another target plate. Accordingly, any number of target plates can be arranged at desired positional intervals.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter comprising:

light sources for projecting measuring luminous flux through a lens to be examined;

light receiving means for detecting the measuring luminous flux projected through the lens to be examined, wherein the light receiving means generates examined data indicative of refractive characteristics of the lens to be examined;

a measurement target having predetermined patterns wherein the measurement target is selectively movable to a plurality of predetermined arrangement positions located on an optical path of the measuring luminous flux, wherein each arrangement position covers a range of a diopter, respectively;

target moving means for automatically moving the measurement target to a selected arrangement position from the plurality of predetermined arrangement positions;

selecting means for selecting the selected arrangement position to which the measurement target is to be moved among the plurality of arrangement positions on the optical path on the basis of the examined data generated by said light receiving means;

control means, responsive to the selected arrangement position selected by the selecting means, for controlling said target moving means to move said measurement target to the selected arrangement position; and calculating means for measuring a refractive power of the lens to be examined based on the selected arrangement position selected by the selecting means and the examined data generated by the light receiving means;

wherein said target moving means comprises rotary means provided with a rotating shaft that extends so as to intersect at right angles with the optical path of the measuring luminous flux, and holding means for holding the measurement target in a position apart from the rotating shaft by a predetermined distance, wherein the measuring target is shifted to a plurality of positions according to a rotating angle of the rotary means.

2. A lens meter according to claim 1, wherein the measuring target supported by the rotary means includes a plurality of target plates.

3. A lens meter according to claim 2, wherein the plurality of target plates are held at different distances from said rotating shaft.

4. A lens meter comprising:

light sources for projecting measuring luminous flux through a lens to be examined;

light receiving means for detecting the measuring luminous flux projected through the lens to be examined, wherein the light receiving means generates examined data indicative of refractive characteristics of the lens to be examined;

a measurement target having predetermined patterns, wherein the measurement target is selectively movable to a plurality of predetermined arrangement positions located on an optical path of the measuring luminous flux, wherein each arrangement position covers a range of a diopter, respectively;

target moving means for automatically moving the measurement target to a selected arrangement position from the plurality of predetermined arrangement positions;

selecting means for selecting the selected arrangement position to which the measurement target is to be moved among the plurality of arrangement positions on the optical path on the basis of the examined data generated by said light receiving means;

control means, responsive to the selected arrangement position selected by the selecting means, for controlling said target moving means to move said measurement target to the selected arrangement position; and calculating means for measuring a refractive power of the lens to be examined based on the selected arrangement position selected by the selecting means and the examined data generated by the light receiving means;

wherein said target is rotatable into and out of the optical path of the measuring luminous flux by the target moving means.

5. A lens meter comprising:

light sources for projecting measuring luminous flux through a lens to be examined;

a light receiving means for detecting the measuring luminous flux projected through the lens to be examined, wherein the light receiving means generates examined data indicative of refractive characteristics of the lens to be examined;

a measurement target having predetermined patterns, wherein the measurement target is selectively movable to a plurality of predetermined arrangement positions located on an optical path of the measuring luminous flux, wherein each arrangement position covers a range of a diopter, respectively;

target moving means for automatically moving the target to a selected arrangement position from the plurality of predetermined arrangement positions;

selecting means for selecting the selected arrangement position to which the measurement target is to be moved among the plurality of predetermined arrangement positions on the optical path on the basis of the examined data generated by said light receiving means;

control means, responsive to the selected arrangement position selected by the selecting means, for automatically controlling said target moving means to move said measurement target to the selected arrangement position; and calculating means for measuring a refractive power of the lens to be examined based on the selected arrangement position selected by the selecting means and the examined data generated by the light receiving means;

wherein said target comprises a plurality of target elements, each target element being rotatable into and out of the optical path of the measuring luminous flux by said target moving means.

6. A lens meter as claimed in claim 5, wherein said target moving means includes a motor having a shaft to which said target elements are coupled.

7. A lens meter as claimed in claim 6, wherein said target elements are spaced from the shaft by different distances.

8. A lens meter comprising:

light sources for projecting measuring luminous flux through a lens to be examined;

a light receiving means for detecting the position of the measuring luminous flux projected through the lens to be examined, wherein the light receiving means generates examined data indicative of refractive characteristics of the lens to be examined;

a measurement target having predetermined patterns, wherein the measurement target is selectively movable to a plurality of predetermined arrangement positions located on an optical path of the measuring luminous flux, wherein the number of the predetermined arrangement positions is limited so as to prohibit ability for detecting the position of the image from deteriorating due to blur of the target image, and each arrangement position covers a range of a diopter, respectively;

target moving means for automatically moving the measurement target to a selected arrangement position from the plurality of predetermined arrangement positions;

selecting means for selecting the selected arrangement position to which the measurement target is to be moved among the plurality of predetermined arrangement positions on the optical path on the basis of the examined data generated by said light receiving means;

control means, responsive to the selected arrangement position selected by the selecting means, for automatically controlling said target moving means to move said measurement target to the selected arrangement position; and calculating means for measuring a refractive power of the lens to be examined based on the selected arrangement position selected by the selecting means and the examined data generated by the light receiving means.

9. A lens meter according to claim 8, wherein said selecting means selects a position at which an optical image of the measurement target comes to be extremely in focus on the basis of the examined data obtained in the time of a preliminary measurement.

10. A lens meter according to claim 8, wherein said selecting means utilizes an equivalent spherical value calculated based on the examined data to select the selected arrangement position.

11. A lens meter according to claim 8, wherein the plurality of predetermined arrangement positions are determined so that an optical image of the measurement target is formed with reduced focus deflection in the time of measuring of a lens having a refractive power with high frequency in use relatively.

12. A lens meter according to claim 8, wherein the plurality of predetermined arrangement positions include a position such that the optical image of the measurement target comes to be in focus on the light receiving means when a lens of approximately ±5D os examined.

13. A lens meter according to claim 12, wherein the plurality of predetermined arrangement positions include a position such that the optical image of the measurement target comes to be in focus on the light receiving means when a lens of approximately ±10D os examined.

* * * * *